US009719625B2

(12) United States Patent
Burmester

(10) Patent No.: US 9,719,625 B2
(45) Date of Patent: Aug. 1, 2017

(54) PIG HANDLING DEVICE

(71) Applicant: GEA Tuchenhagen GmbH, Büchen (DE)

(72) Inventor: Jens Burmester, Grambek (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 14/911,130

(22) PCT Filed: Jul. 14, 2014

(86) PCT No.: PCT/EP2014/001927
§ 371 (c)(1),
(2) Date: Feb. 9, 2016

(87) PCT Pub. No.: WO2015/018477
PCT Pub. Date: Feb. 12, 2015

(65) Prior Publication Data
US 2016/0195213 A1  Jul. 7, 2016

(30) Foreign Application Priority Data
Aug. 9, 2013 (DE) .................. 10 2013 013 220

(51) Int. Cl.
*F16L 55/46* (2006.01)
(52) U.S. Cl.
CPC .................... *F16L 55/46* (2013.01)
(58) Field of Classification Search
CPC .................................................. F16L 55/46
See application file for complete search history.

(56) References Cited

U.S. PATENT DOCUMENTS

| 5,444,886 A | * | 8/1995 | Takashina | ............... F16L 55/46 |
| | | | | 15/104.062 |
| 6,029,302 A | * | 2/2000 | Coura | ..................... B08B 9/055 |
| | | | | 15/104.062 |

FOREIGN PATENT DOCUMENTS

| DE | 1 775 03 A | 3/1905 |
| DE | 94 120 43 U1 | 11/1994 |
| DE | 197 36 292 C1 | 8/1998 |
| DE | 101 44 860 A1 | 6/2002 |
| DE | 20 2010 012173 U1 | 4/2011 |
| GB | 2 430 019 A | 3/2007 |
| WO | 95/33952 A1 | 12/1995 |

* cited by examiner

*Primary Examiner* — Randall Chin
(74) *Attorney, Agent, or Firm* — Young Basile Hanlon & MacFarlane, P.C.

(57) ABSTRACT

A pig handling device has a housing, a cavity found in the housing in which a pig can be received, a connection by means of which the cavity is connectable to a processing system, the connection suitable for allowing the pig to pass through, and a handling element that is arranged in the cavity, influences the mobility of the pig in the cavity, and has a base element and a functional element. The base element has a first surface, and the functional element is connected to the base element in the cavity and has a second surface. The arrangement improves cleanability in that the handling element has a concavely curved transition surface arranged between the first surface and the second surface and having a core curvature region, and in that the base element and the functional element are bonded to one another outside of the core curvature region.

16 Claims, 4 Drawing Sheets

PIG HANDLING DEVICE

TECHNICAL FIELD

The disclosure relates to a pig handling device.

BACKGROUND

There is a general requirement to minimize product losses in modern production systems, in particular in the milk and food industry, in the beverage industry as well as in the personal and health care industry. Moreover, the standards for the waste water quality of such systems are increasing. This is counteracted with the use of so-called pigging systems, with which a cleaning body that is named pig is moved through the pipeline system of the production system in order to push out valuable, free-flowing products without mixing with other media from the pipelines. Pig handling devices serve to automate this process step.

Such a pigging station, in which a pig is stored and can be automatically released into the pipeline system at the desired point in time, is introduced in WO 1995/033952 A1. This publication improves cleanability of the pigging station with improvements geared towards the holding of the pig in the station and enables in particular a better cleaning of the pig. Through a holding with play, the mobility of a pig in the cleaning agent flow is achieved such that the complete surface of the pig is cleaned. A further aspect in the igging station described therein is the dead-space-free design of the wall of the interior space of the station, in particular through an interior space contour shaped in a flow-suitable manner.

A pigging station through which a product can flow, which is designed as a sending and receiving station, is shown in DE 101 44 860 A1. Therein, it is suggested to provide two connections arranged coaxially to each other and designed so that the pig can pass through. The mobility of the pig within the pigging station is monitored by an adjustable catch bracket. Disadvantageous deviations of the product flow are avoided and the cleanability is enhanced.

DE 94 12 043 U1 suggests a pigging station in which the pig is fixable in its position, which can be flowed around, by two controllable stops. In addition to a first pipeline connection, the station has a second, laterally attached pipeline connection. The goal is to reduce dead spaces and to thus improve the product flow through the pigging station.

A device for catching a ball moving within a pipeline is suggested in DE 1 775 03 A. The device has a part that is detachable by means of a pusher valve, in which the ball is received. The goal is to be able to remove the ball from the pipeline in a simple and secure manner.

SUMMARY

The teachings herein describe a pig handling device with improved device cleanability.

Embodiments of the invention are based on the rationale of including additional parts of the device for pig handling into consideration in addition to the pigging surface and the interior space contour. Handling elements with which the movements of the pig in this interior space are influenced in a targeted manner are located in the interior space of the device. A handling element is generally made of several parts due to its size. The design of a handling element built from a base element with a first surface and a functional element with a second surface is described herein.

A concavely curved transition surface is arranged with a core curvature region between a first surface and a second surface, wherein the functional element and the base element are bonded to one another outside of the core curvature region. In particular in the case of surfaces converging at an angle, a concave transition surface creates an easy-to-clean surface of the handling element so that attached grime can be reliably removed. The surface connection lies outside of the region, in which the first and second surfaces converge at an angle. The surface region of a surface connection is as smooth as possible in order to ensure a reliable cleanability. In this connection, the arrangement of the surface connection outside of the curvature region is very advantageous because a smooth surface of the surface connection can be established in a technically reliable and cost-effective manner. The cleanability of the pig handling device is improved over the prior art through the measures according to the invention.

According to a further development, this advantage is even greater when the first and second surfaces converge at an angle of less than 135° and the core curvature region has a curvature radius of at least 6.35 mm.

Another further development suggests arranging the transition surface on the base element and thus simplifying the functional element. Moreover, a material savings is enabled, for example in a rod-like functional element.

An embodiment of the invention can be further developed in that the base element comprises a receiving cavity, in which the functional element is received in sections in a guided manner, wherein it is then surrounded by a section having the transition surface. A very good orientation of the base element and the functional element with respect to each other is hereby achieved before the surface connection is established.

A further development relating to the transition surface arranges it on the functional element. The orientation is hereby facilitated before the establishment of the surface connection because a force directed towards the surface connection can be introduced near the surface connection. Moreover, the transition surface can be used to expand the functional element on the adhesive connection, and thus also improve the orientation.

According to another further development, the handling element is designed as a guiding arrangement, wherein the base element is connected with the housing, and the functional element for guiding the pig is designed at a radial distance from a wall surface delimiting the cavity. This advantageously prevents the pig from attaching to the wall surface. Transitions from the pig surface to the wall surface that are susceptible to contaminants and that are acute-angled are hereby prevented.

According to one embodiment, the functional element can comprise at least one rod, whereby the contact of the functional element and the pig necessary for the handling of the pig takes places with a small contact surface. Moreover, geometrically simple and thus easily cleanable surfaces are created.

The cleanability of the device can also be simplified in that the base element is designed as one piece with the housing of the device. Transition points between components, which are difficult to work on, are hereby avoided in order to ensure good cleanability.

According to another further development, the handling element is formed as a gripping structure. The base element is thereby designed as a fastening head, to which the functional element designed as one or more rods shaped like a gripping arm is attached. Such a handling element permits the handling, in particular delimitation, of the pig movements in the axial and radial direction in a simple and reliably cleanable manner. This fastening head can act as a stopper in the axial direction.

This further development can be improved with respect to a technically simple automation through a pressurizing-medium-driven gripper drive. The fastening head is shiftable with the gripper drive.

According to another further development, the device has in its interior space, in addition to the first handling element, a second handling element. One of the first handling element or the second handling element is designed as a guiding arrangement as described above and the other as a gripping structure as also described above. On one hand, this improves the guidance and handling of the pig and ensures good cleanability of the device through the design of the guiding arrangement and gripping structure described above.

The further development just described is improved when the guiding arrangement and the gripping structure are designed so that the pig can be received in it with play. The formation of permanent contact points is thereby prevented and a cleaning of all surface parts is ensured.

The device can comprise a shiftable stopper, with which the pig in cooperation with the handling element is held securely in the cavity, for example in the case of strong cleaning flows.

A cost-effective automation of the device is given with the help of a pressurizing-medium-driven stopper drive, with which the stopper is shiftable.

The device can comprise a second connection, which is arranged such that a fluid flow flowing around the pig located in the cavity is designable. The pig and the handling element(s) in the fluid flow are hereby reliably cleaned. A particularly good cleaning of the handling element and the pig results in cooperation with the play described above.

A further improved cleanability of the device is achieved when all wall surfaces of the housing converging at an angle of less than 135° and delimiting the cavity transition into each other with a transition radius of at least 6.35 mm.

The invention shall be explained in greater detail based on an exemplary embodiment and its further developments and the representation of the effects and advantages will be covered in greater detail.

DETAILED DESCRIPTION

Figure 1:
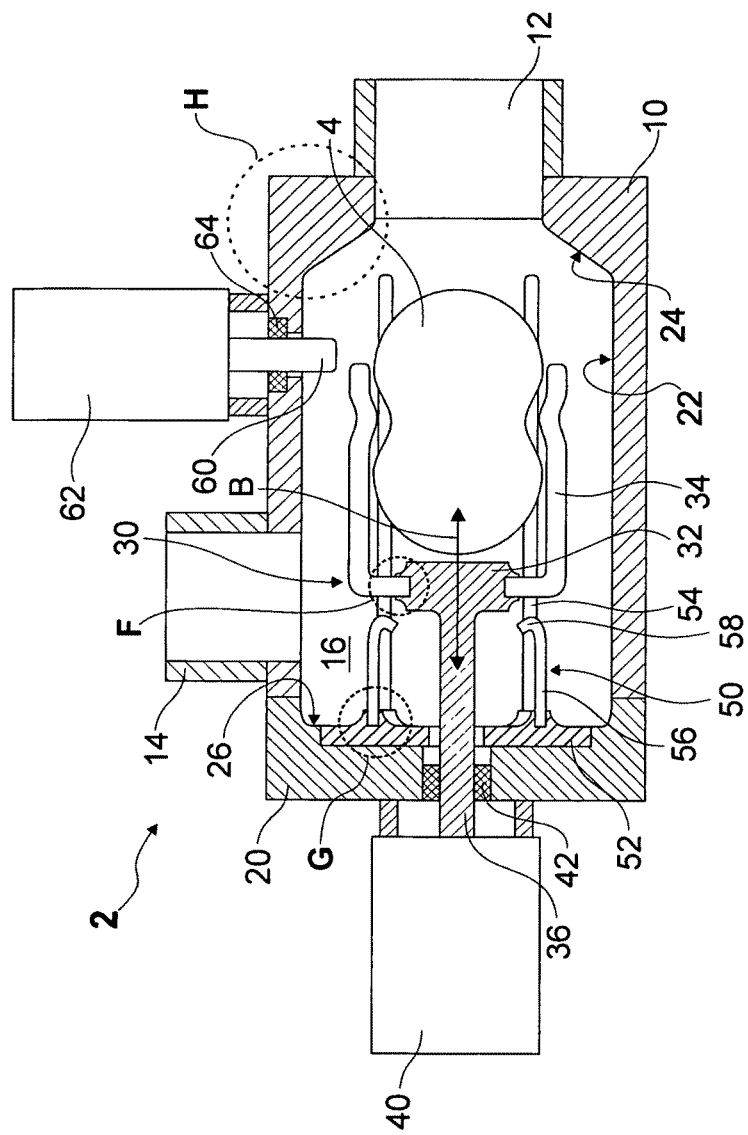
FIG. 1 shows a cross-section through a device for pig handling with a pig located inside the device.

FIG. 1 shows, in a cross-sectional representation, a device 2 for handling a pig 4. The device 2 has a housing 10 with a cavity 16, which is bordered by a lateral wall surface 22, a sloping wall surface 24 and a rear wall surface 26.

A first connection 12 is provided on the housing 10 and allows the connection of the device 2 with a pipeline of a pipeline system of a production system. The pig 4, which can enter or exit the cavity 16 through the first connection 12, is receivable in the cavity 16. The first connection 12 is set to the diameter of the pig 4, in particular with respect to its inner diameter. The diameter of the pig 4 is in turn set to the inner diameter of the pipeline of the production system, because in order to remove product from the pipeline as effectively as possible, these diameters differ only slightly from each other.

A second connection 14 is provided on the housing 10. With its help, the device 2 can be installed in the production path of the production system. The product flows through the device 2 during production. When the product needs to be removed from the production system with the help of the pig 4, a driving medium is let into the device 2 through the second connection 14, which subsequently pushes the pig 4 through the production system. Moreover, the second connection 14 is used to let the cleaning agent into the cavity 16 of the device 2.

A first handling element is designed as a gripping structure 30. This gripping structure 30 has a fastening head 32 as the base element, to which a ring of gripping arms 34 is attached, wherein the gripping arms 34 each represent a functional element. The gripping arms 34 are designed such that they prevent the pig 4 from moving freely in the direction of the first connection 12. The fastening head 32 acts as a stopping means in order to restrict the movement of the pig 4 away from the first connection 12 in the direction towards the rear wall surface 26.

The gripping structure 30 has a gripper rod 36, which penetrates a rear part 20 of the housing 10.

The gripper rod 36 and the rear part 20 of the housing 10 are sealed by means of a seal 42 in order to separate the cavity 16 from the surrounding area of the device 2. The gripper rod 36 works with a gripper drive 40, which can move the gripping structure 30 in a straight-line movement back and forth along a movement direction B. The gripper drive 40 is designed as a pressurizing-medium-driven drive. With the help of the gripper drive 40, the gripping structure 30 can be moved towards the rear part 20 of the housing 10 in order to bring the pig 4 into an idling position. The gripping structure 30 can be moved in the direction of the first connection 12, in order to bring the pig 4 into a sending position, in which it can be removed from the device 2 and moved into the pipeline by the propellant. This movement can perform a phase of the product recovery.

A second handling element is designed as a guiding arrangement 50. The guiding arrangement 50 has a base element 52, which is designed as a ring with a mainly rectangular cross-section. This ring is connected with the rear part 20 of the housing 10. In order to ensure good cleanability, the ring is preferably sunk flush in the rear part 20 so that its surface is evenly closed off with the rear wall surface 26. In a further development, the base element 52 is designed as one piece with the rear part 20 of the housing 10.

Several guide rods 54, which extend along the movement direction B, are fastened on the base element 52. They form a cage, which prevents the contact of the pig 4 and of the lateral wall surface 22 in each position of the gripping structure 30 and of the pig 4. Moreover, several stop rods 56, which have an end section 58 bent towards the gripper rod 36, are provided on the base element 52, preferably in a circular arrangement. These end sections 58 form a stop for the pig 4 when the gripping structure 30 is located in the position pulled back from the rear part 20.

The device 2 has a further retaining element with which the pig 4 can be held in the cavity 16. A stopper 60 penetrates the wall of the housing 10 and protrudes from the lateral wall surface 22. A seal 64, which seals the wall surface 22 and the stopper against each other and thus permanently separates the surrounding area of the device 2 from the cavity 16, is located at the penetration point. The stopper 60 is operatively connected with a stopper drive 62. With the help of the stopper drive 62, the stopper 60 can move in a straight-line movement far enough into the cavity 16 such that the pig 4 can no longer get to the first connection 12. The stopper 60 can be pulled far enough back with the stopper drive 62 so that the pig can reach the pipeline from the cavity 16 and through the first connection 12.

Figure 2:
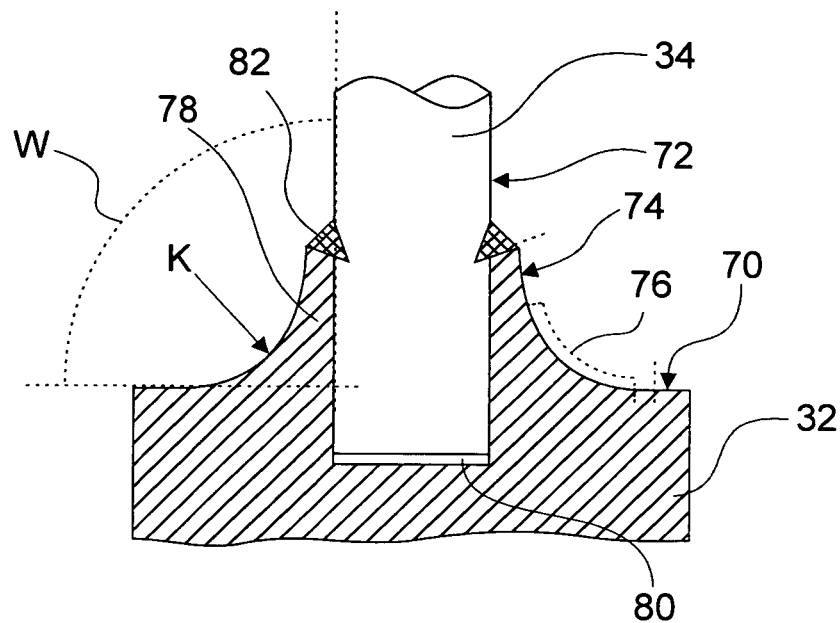
FIG. 2 shows a cross-section through a detailed view F from FIG. 1.

FIG. 2 shows one design option for a detailed area F of FIG. 1. The fastening head 32 of the gripping structure 30 is shown in the partial cross-section of each area, in which a gripping arm 34 is connected with the fastening head 32. The fastening head 32 has a first surface 70, while the gripping arm 34 has a second surface 72. In a three-dimensional room, the first surface 70 mainly forms a cylinder. The second surface 72 is also a cylinder in the shown area of the gripping arm 34, which sits perpendicularly on the cylinder of the first surface 70. The smallest angle, at which the first and second surface 70 and 72 converge three-dimensionally, is a marked angle W. Angle W is a right angle in this example. A section 78 protruding from the first surface 70 is provided, which has a receiving cavity 80. The section 78 surrounds the gripping arm 34, and the receiving cavity 80 receives the gripping arm 34 in a form-fitting manner.

The first surface 70 and the second surface 72 merge into each other by means of a transition surface 74. The transition surface 74 is concavely curved and has a core curvature region 76 with a curvature radius K. The core curvature region 76 is that part of the transition surface 74 in which the curvature is clearly pronounced. The curvature of the transition surface 74 transitions into the curvature of the first surface 70 or second surface 72 outside of the core curvature region 76. According to a further development, the curvature radius K is at least 6.35 mm.

The gripping arm 34 and the fastening head 32 are bonded to one another. The surface connection is arranged outside of the core curvature region 76 so that the transition from the first surface 70 and the second surface 72 is not located in a region with a strong surface curvature. This is advantageous because the curvature only needs to be executed on one component and can be established in a particularly exact manner. Moreover, it is avoided that the transition surface 74 is uneven in its particularly curved region due to the surface connection. This is advantageously in relation to production and cleanability.

A simple form of the surface connection well suited for use in the food and fine chemical industries is a welded seam 82. This is realized around the gripping arm 34 and is located on the free end of the section 78, at which end the transition surface 74 transitions into the second surface 72.

The transition from the second surface 72 to the transition surface 74 can have a slight step, as shown. A sloping transition between the second surface 72 and the transition surface 74 can be created through a welded seam in a welding process with a welding filler material. The welded seam can be polished or smoothed in order to improve its dirt-repelling properties.

In FIG. 1, the connection between the stop rod 56 and the base element 52 is realized in the same manner as the connection of the gripping arm 34 and the fastening head 32 explained based on FIG. 2. FIGS. 3-6 show further design options for the detailed area G.

Figure 3:
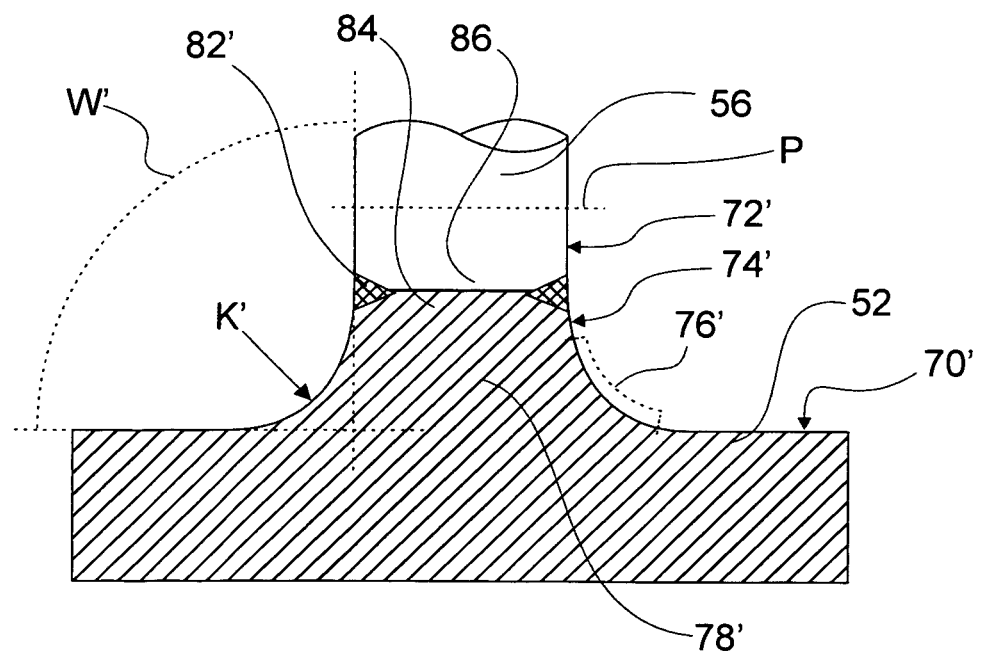
FIG. 3 shows a cross-section through a detailed view G from FIG. 1 in a second design.

FIG. 3 shows a cut through the mainly annular base element 52 with a first surface 70'. The base element 52 has a section 78', which rises on the first surface 70' and has a blunt end 84. The mainly cylindrical stop rod 56 with a second surface 72' sits with its end 86 on the blunt end 84. The first surface 70' and the second surface 72' form an angle W' of 90 degrees.

The concavely curved transition surface 74', which creates a transition from the first surface 70' into the second surface 72', is provided on the section 78'. The transition surface 74' is provided with a core curvature region 76'. The core curvature region 76' has a curvature radius K', which is preferably at least 6.35 mm. The blunt end 84 of the base element 52 and the end 86 of the stop rod 56 are bonded to one another outside of the core curvature region 76'. This surface connection can be established through welding, as is the case with the connection of the fastening head 32 and gripping arm 34 in FIG. 2. This design has a particularly smooth transition from the second surface 72' into the transition surface 74'. Welding procedures without the use of welding filler material can be used.

Figure 4:
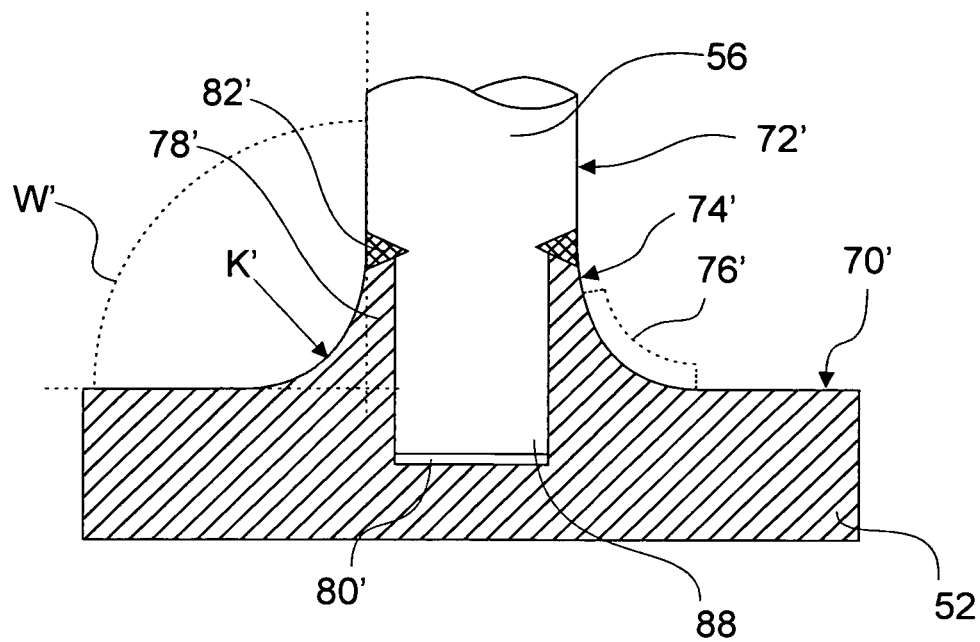
FIG. 4 shows a cross-section through a detailed view G from FIG. 1 in a third design.

The design according to FIG. 4 deviates from that according to FIG. 3 as follows. The stop rod 56 has on its end a pin extension 88. In a cylindrical rod, the pin extension 88 can be a rod section with a reduced diameter. The pin extension 88 is received in a form-fitting manner and completely in a receiving cavity 80'. It is conceivable to further develop the form fit such that the stop rod 56 cannot turn in the receiving cavity 80'.

The receiving cavity 80' is provided in the section 78' and can extend up to into the base element 52. Through the complete receiving of the pin extension 88, the second surface 72' of the stop rod 56 and the transition surface 74' located on the section 78' of the base element 52 hit each other and form a common surface, which can advantageously be designed in a flush manner. The surface connection in the form of a welded seam 82' between the base element 52 and the stop rod 56 is established at the transition from the second surface 72' into the transition surface 74' and is located outside of the core curvature region 76'.

Special advantages of this design lie in the easily producible smooth transition from the second surface 72' into the transition surface 74' and the simplified orientation of the base element 52 and the stop rod 56 with respect to each other before the surface connection is established.

Figure 5:
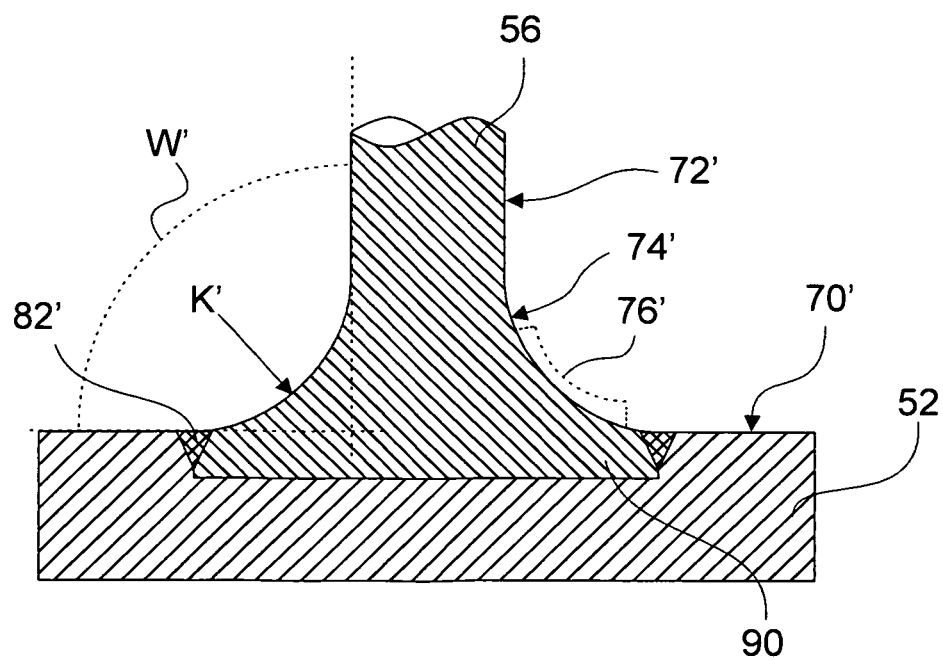
FIG. 5 shows a cross-section through a detailed view G from FIG. 1 in a fourth design.

FIG. 5 shows in cross-section a further exemplary embodiment for the connection of the base element 52 and the stop rod 56 from the detail G in FIG. 1. The stop rod 56 has a foot 90, which has a cross-section expanded with respect to the stop rod 56. The stop rod 56 has the second surface 72', which transitions seamlessly into the transition surface 74', and has a core curvature region 76' with a curvature radius K'. The transition surface 74' is located on the foot 90. The foot 90 is received in a form-fitting manner by a recess on the base element 52 and is thereby sunk in the base element 52 such that the transition surface 74' transitions in a preferably flush manner into the first surface 70' of the base element 52. A welded seam 82' for creating a surface connection of the base element 52 and the stop rod 56 is provided at the transition point and outside the core curvature region 76'. In the example shown, the angle W' between the first surface 70' and the second surface 72' is right-angled. Depending on the design of the guiding arrangement 50, a smaller or larger angle W' may be necessary. A special advantage of this exemplary embodiment is the large diameter of the welded seam 82', which has advantages both for the orientation of the components with respect to each other before the surface connection is established as well as for the load capacity through leverage forces acting on the stop rod 56, for example parallel to the first surface 70'.

Figure 6:
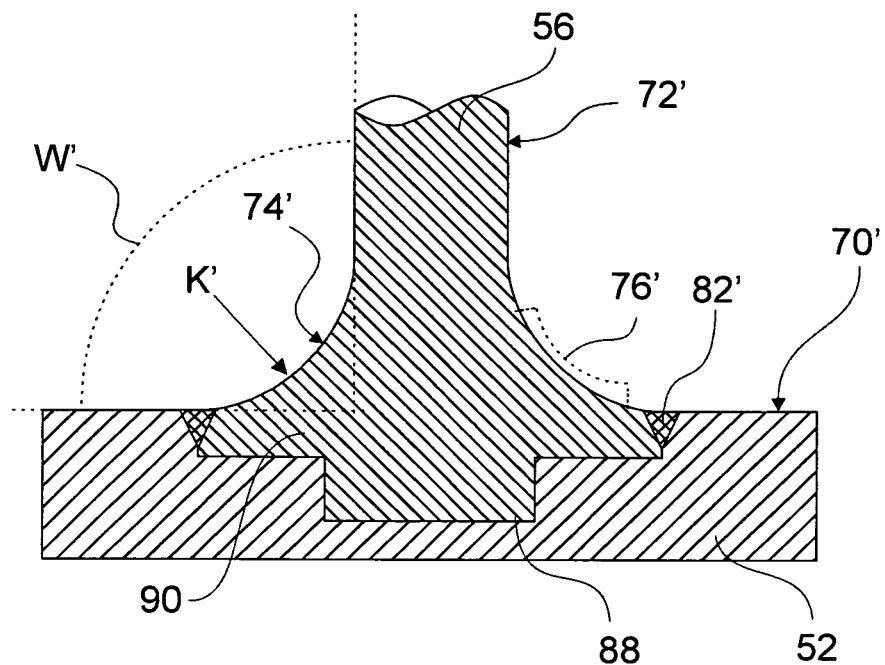
FIG. 6 shows a cross-section through a detailed view G from FIG. 1 in a fifth design.

FIG. 6 shows in cross-section an enhancement of the embodiment just described. An end of the stop rod 56 with the second surface 72' has an enhancement in the form of a foot 90. On the side of the foot 90 lying opposite the stop rod 56, the foot 90 has a pin extension 88. The pin extension 88 and the foot 90 are received in a recess of the base element 52. The mainly cylindrical second surface 72' transitions into the concavely curved transition surface 74', which has a core curvature region 76' with a curvature radius K'. It is advantageously at least 6.35 mm. The foot 90 and the pin extension 88 are received in the base element 52 up to a depth such that the transition surface 74' transitions into the first surface 70' with a step of a few tenths of a millimeter or less. The transition surface 74' can also still have a slight curvature outside of the core curvature region 76'. The base element 52 and the stop rod 56 are bonded to one another outside of the core curvature region 76' through a welded seam 82'.

The connections between the base element 52 and the stop rod 56 shown based on FIGS. 3-6 are also applicable to the connection between the base element 52 and the guide rod 54.

Furthermore, the design options for the transition from the first surface 70 and 70' to the second surface 72 and 72' shown based on FIGS. 2-6 can be used interchangeably. The design shown for the transition at the gripping structure 30 can be used for the guiding arrangement 50 and vice versa. Here, the gripping arm 34 corresponds to the stop rod 56, and the fastening head 32 corresponds to the base element 52.

It is advantageous to apply the characteristics of FIGS. 2-6 to all base elements 32, 52 and functional elements 34, 54 and 56 converging at an angle of less than 135° and located in the cavity 16.

Figure 7:
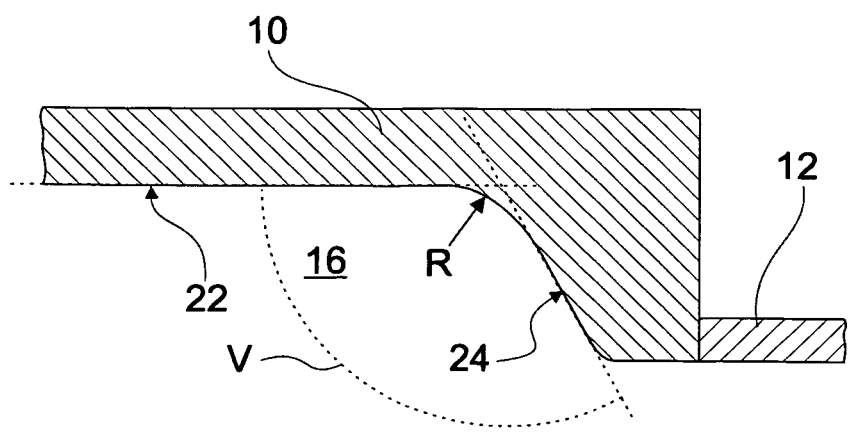
FIG. 7 shows a cross-section through a detailed view H from FIG. 1.

FIG. 7 shows in detail a section labeled with H in FIG. 1. The lateral wall surface 22 and the sloping wall surface 24 delimit the cavity 16 inside the housing 10. The sloping wall surface 22 advantageously transitions into the first connection 12 with a rounded transition. The wall surfaces 22 and 24 hit each other at an angle V. In order to keep the installation length of the device 2 short, this angle V is less than 135°. A radius R of at least 6.35 mm is formed at the transition of the wall surfaces into each other so that this transition is easily cleanable.

A list of the reference numbers herein is included below.
2 Device
4 Pig
10 Housing
12 First connection
14 Second connection
16 Cavity
20 Rear part of the housing
22 Lateral wall surface
24 Sloping wall surface
26 Rear wall surface
30 Gripping structure
32 Fastening head
34 Gripping arm
36 Gripper rod
40 Gripper drive
42 Seal (gripper)
50 Guiding arrangement
52 Base element
54 Guide rod
56 Stop rod
60 Stopper
62 Stopper drive
64 Seal
70 First surface
70' First surface
72 Second surface
72' Second surface
74 Transition surface
74' Transition surface
76 Core curvature region
76' Core curvature region
K Curvature radius
K' Curvature radius
78 Section
78' Section
80 Receiving cavity
80' Receiving cavity
82 Welded seam
82' Welded seam
84 Blunt end
86 End
88 Pin extension
90 Foot
B Movement direction
W Angle
W' Angle
V Angle (housing)
R Transition radius
P Position
F View F
G View G
H View H

The invention claimed is:

1. A pig handling device, comprising:
    a housing;
    a cavity situated in the housing and sized for receiving a pig;
    a connection with which the cavity can be connected to a processing system and which is suitable for allowing the pig to pass through; and
    a handling element, which is arranged in the cavity, influences a mobility of the pig in the cavity, and has a base element that has a first surface and a functional element that is connected to the base element in the cavity and that has a second surface, wherein:
    the handling element has a concavely curved transition surface that is arranged between the first surface and the second surface and that comprises a core curvature region, and
    the base element and the functional element are bonded to one another outside of the core curvature region.

2. The device according to claim 1, wherein the first surface and the second surface together form an angle of less than 135° and the core curvature region has a curvature radius of at least 6.35 mm.

3. The device according to claim 2, wherein the transition surface is arranged on the functional element.

4. The device according to claim 1, wherein the transition surface is arranged on the base element.

5. The device according to claim 4, wherein the base element comprises a receiving cavity in which the functional element is received and surrounded by a section having the transition surface.

6. The device according to claim 1, wherein the handling element comprises a guiding arrangement such that the base element is connected with the housing and the functional element guides the pig at a radial distance to a wall surface delimiting the cavity.

7. The device according to claim 6, wherein the functional element comprises a rod.

8. The device according to claim 6, wherein the base element is designed as one piece with the housing.

9. The device according to claim 1, wherein the handling element comprises a gripping structure such that the base element comprises a fastening head and the functional element comprises a rod shaped like a gripping arm.

10. The device according to claim 9, further comprising:
a pressurizing-medium-driven gripper drive that is arranged to shift the fastening head.

11. A pig handling device, comprising:
a housing;
a cavity situated in the housing and sized for receiving a pig;
a connection with which the cavity can be connected to a processing system and which is suitable for allowing the pig to pass through;
a first handling element arranged in the cavity and having a base element and a functional element that is connected to the base element in the cavity, wherein the first handling element comprises a guiding arrangement such that the base element of the first handling element is connected with the housing and the functional element of the first handling element guides the pig at a radial distance to a wall surface delimiting the cavity; and
a second handling element arranged in the cavity and having a base element and a functional element that is connected to the base element in the cavity, wherein the second handling element comprises a gripping structure such that the base element of the second handling element comprises a fastening head and the functional element of the second handling element comprises a rod shaped like a gripping arm.

12. The device according to claim 11, wherein the guiding arrangement and the gripping structure are arranged such that the pig is receivable with play.

13. The device according to claim 11, further comprising:
a shiftable stopper extending radially into the cavity through the wall surface delimiting the cavity, with which the pig is fixable in the cavity.

14. The device according to claim 13, further comprising:
a pressurizing-means-driven stopper drive, with which the shiftable stopper is shiftable.

15. The device according to claim 11, further comprising:
a second connection arranged to allow a fluid to flow around the pig located in the cavity.

16. The device according to claim 11, wherein all wall surfaces of the housing, converging at an angle of less than 135° and delimiting the cavity, transition into each other with a transition radius of at least 6.35 mm.

* * * * *